(12) United States Patent
Schott et al.

(10) Patent No.: US 7,338,601 B2
(45) Date of Patent: Mar. 4, 2008

(54) MEMBRANE SEPARATION ASSEMBLIES

(75) Inventors: Mark E. Schott, Des Plaines, IL (US); A. William Schwartz, Anaheim, CA (US)

(73) Assignee: UOP LLC, Des Plaines, IL (US)

( * ) Notice: Subject to any disclaimer, the term of this patent is extended or adjusted under 35 U.S.C. 154(b) by 178 days.

(21) Appl. No.: 11/009,682

(22) Filed: Dec. 10, 2004

(65) Prior Publication Data

US 2006/0124529 A1 Jun. 15, 2006

(51) Int. Cl.
*B01D 63/00* (2006.01)
*B01D 53/22* (2006.01)
*B01D 59/12* (2006.01)
*C02F 1/44* (2006.01)

(52) U.S. Cl. .......................... 210/321.74; 210/321.83; 210/330; 210/232; 210/257.2; 96/4; 96/10

(58) Field of Classification Search ........... 210/321.83, 210/321.86, 321.84, 321.6, 652, 330, 321.72, 210/321.74, 257.2, 232, 456; 96/4, 10
See application file for complete search history.

(56) References Cited

U.S. PATENT DOCUMENTS

| | | | | |
|---|---|---|---|---|
| 3,880,785 A * | 4/1975 | Piiroya et al. | ............... | 527/603 |
| 4,083,780 A * | 4/1978 | Call | ............... | 210/652 |
| 4,517,085 A * | 5/1985 | Driscoll et al. | ............... | 210/232 |
| 4,746,430 A | 5/1988 | Cooley | ............... | 210/321.85 |
| 4,808,199 A | 2/1989 | Yearout | ............... | 55/16 |
| 4,874,405 A | 10/1989 | Minhas | ............... | 55/158 |
| 5,128,037 A * | 7/1992 | Pearl et al. | ............... | 210/321.74 |
| 5,137,631 A * | 8/1992 | Eckman et al. | ............... | 210/321.8 |
| 5,221,473 A * | 6/1993 | Burrows | ............... | 210/232 |
| 5,470,469 A * | 11/1995 | Eckman | ............... | 210/321.8 |
| 5,851,267 A | 12/1998 | Schwartz | ............... | 96/7 |
| 5,866,001 A * | 2/1999 | Hlebovy | ............... | 210/321.6 |
| 6,136,073 A | 10/2000 | Coan et al. | ............... | 96/8 |
| 6,153,097 A | 11/2000 | Jensvold et al. | ............... | 210/321.81 |
| 6,521,127 B1 * | 2/2003 | Chancellor | ............... | 210/321.72 |
| 6,632,356 B2 * | 10/2003 | Hallan et al. | ............... | 210/321.6 |
| 2002/0162451 A1 | 11/2002 | Bikson et al. | ............... | 95/51 |

* cited by examiner

*Primary Examiner*—Ana Fortuna
(74) *Attorney, Agent, or Firm*—Mark Goldberg

(57) ABSTRACT

Assemblies for use in separation of a fluid feed. Assemblies typically include an elongated housing having a fluid feed stream inlet, a residual stream outlet and a permeate stream outlet. The housing contains at least one membrane separation element to form a membrane separation element linear string that at least in part defines a linear permeate passage tube. A permeate adapter is joined with an end of the linear permeate passage tube. The permeate adapter includes a receiving opening for receiving an end of the linear permeate passage tube. The adapter defines a permeate passageway extending therethrough and includes a plurality of permeate discharge openings disposed such as to place the receiving opening and the permeate discharge openings in fluid flow communication.

16 Claims, 7 Drawing Sheets

MEMBRANE SEPARATION ASSEMBLIES

BACKGROUND OF THE INVENTION

This invention relates generally to fluid separation and, more particularly, to fluid separation via one or more membrane separation element assemblies. A variety of commercial processes rely on fluid separation techniques in order to separate one or more fluid components from a mixture. In particular, various such processes may involve the separation of liquid mixtures, the separation of vapors or gases from liquids, or the separation of intermingled gases.

For example, carbon dioxide, commonly categorized as an acid gas, is frequently found in natural gas streams, such as in levels as high as 80%. In combination with water, carbon dioxide can be highly corrosive and rapidly damage or destroy pipelines and associated processing equipment. Consequently, such processing typically has required either the use of exotic and more costly materials of construction or the effective isolation or removal of carbon dioxide from the process stream.

While a variety of acid gas removal technologies, including absorption processes, cryogenic processes, adsorption processes are available, fluid separation via the use of membranes, e.g., thin semipermeable membranes that selectively separate some fluid compounds or constituents from others, has experienced increased popularity for such and various other fluid separation applications. Such membrane separations are generally based on relative permeabilities of various components of the fluid mixture, resulting from a gradient of driving forces, such as pressure, partial pressure, concentration and temperature. Such selective permeation results in the separation of the fluid mixture into portions commonly referred to as "retentate", e.g., generally composed of slowly permeable components, and "permeate", e.g., generally composed of faster migrating components.

Gas separation membranes are commonly manufactured in one of two forms: flat sheet or hollow fiber. The flat sheets are typically combined into a spiral wound element, whereas the hollow fibers are commonly bundled together in a manner similar to a shell and tube heat exchanger.

In typical spiral wound arrangements, two flat sheets of membrane with a permeate spacer in between are joined, e.g., glued, along three of their sides to form an envelope, i.e., a "leaf", that is open at one end. Many of these envelopes are separated by feed spacers and wrapped around or otherwise to form a permeate tube with the open ends of the envelopes facing the permeate tube. Feed gas enters along the side of the membrane and passes through the feed spacers separating the envelopes. As the gas travels between the envelopes, carbon dioxide and other highly permeable compounds permeate into the envelope. These permeated components have only one available outlet: they must travel within the envelope to the permeate tube. The driving forces for such transport is the low permeate and the high feed pressures. The permeate gas enters the permeate tube, such as through holes passing though the tube. The permeate gas then travels through the tube to join the permeate from other of the tubes. Gas on the feed side that does not permeate, leaves through the side of the element opposite the feed position.

In hollow fiber elements, very fine hollow fibers are wrapped around a central tube in a highly dense pattern. In such a wrapping pattern, both ends of the fiber end up at a permeate pot on one side of the element. Feed gas flows over and between the fibers, and some components permeate into them. The permeated gas then travels within the fiber until it reaches the permeate pot, where it mixes with permeates from other of the fibers. The total permeate exits the element through a permeate conduit or pipe. The gas that does not permeate eventually reaches the central tube of the element, which is typically perforated similar to the permeate tube in the spiral wound element. In this case, however, the central tube is for residual collection, not permeate collection.

As will be appreciated, each element type has certain advantages. For example, spiral wound elements typically can handle higher pressures, are more resistant to fouling and have a long history in service in natural gas sweetening. In contrast, hollow fiber elements typically have a higher packing density. Consequently, hollow fiber-based installations are typically smaller than a corresponding spiral wound installation.

In either case, the membranes, once produced into elements, are typically formed into modules, e.g., a tube containing a plurality of membrane separation elements. Modules can be used singly or, more commonly, interconnected in series or parallel arrangements or arrays. Typically, an installation may have from at least two up to several hundred modules in an array. Each module will have an input (e.g., feed) stream, an output or residual stream that contains the substances which did not pass through the membrane separation element and a permeate stream contains the substances which pass through, e.g., permeate through, the membrane separation element.

Many such separation applications require rather high pressures. In many instances the pressures in such processes are in the range of about 3447 to about 20684 kPa (500 to 3000 psi). In dealing with such pressures, besides having sufficient wall thickness, it is necessary to have good pressure seals. The various process flow streams (e.g., feed, residual and permeate streams) must remain properly separated. Any intermingling of these streams decreases the efficiency of the process.

Current spiral wound membrane gas separation pressure vessel configurations are a product of the reverse osmosis industry, where such configurations have been their standard from many years. This vessel concept was designed for applications where filament wound plastic tubes could be easily incorporated, e.g., the internal diameter of the plastic tube could be easily manufactured to exact dimensions as the membrane web was wound over a mandrel.

The gas membrane industry has needed to modify the standard reverse osmosis vessel configuration to meet or satisfy their unique process requirements. For example, they could incorporate larger permeate pipes or conduits in order to better handle larger possible permeate flows. Further, in order to meet the typical high pressure operation requirements associated with the gas processing industry and the tight roundness and diameter specifications required for such processing, steel tubing has been employed and with the internal diameter of the steel tubing honed to an appropriately high surface finish, e.g., 16 RMS or less.

In addition, an end draw configuration, such as used in reverse osmosis processing, has also typically been utilized in gas membrane separation applications. Such end draw configurations typically result in the permeate header extending out from the ends of the pressure tubes. Thus, such configurations generally result in a membrane skid being made longer than otherwise desired or in a reduction in length of the membrane tubes used therein, with a corresponding reduction in the capacity of the unit.

One of the difficulties in building such membrane skids is the need to ensure that the permeate header lines up perfectly with the flange connections at the end of the membrane pressure tube. Moreover, the permeate header must typically be removed every time membrane elements are loaded and unloaded in the tube. In use, such membrane module assemblies may be subjected to repeated pressurization and depressurization cycles due to periodic equipment maintenance and day-to-day processing needs requiring equipment shut-down. However, the seals of a module may not be capable of elastically responding to a rapidly decreasing pressure when the module is depressurized sufficient to maintain a reliable seal with or in conjunction with associated membranes. As a result, it is likely that the seals may become displaced and/or lose sealing contact during depressurization which, in turn, causes fluid leakage to occur if the module is subsequently attempted to be repressurized. Such fluid leakage will thus cause the module to fail to perform its intended fluid-separation functions. Once fluid leakage has occurred, therefore, the only alternative is to remove the module from service and rebuild the membrane seal components.

In addition, a common problem associated with the use of spiral wound membranes is that each module containing the membranes is typically required to be machined to close tolerances in order to assure good pressure seals. As a result, cost for each module can be significantly increased.

Thus, there is a need and a demand for improved assemblies for use in separation of a fluid feed via a plurality of membrane separation elements.

There is also a need and a demand for improved membrane separation assemblies that permit permeate fluid removal from a location other than the end center of the tube. In particular, there is a need and a demand for improved membrane separation assemblies that permit permeate removal from both ends of a membrane string. Further, for example, there is a need and a demand for improved membrane separation assemblies that permit permeate removal from one or more desired locations intermediate to the ends of the tube.

SUMMARY OF THE INVENTION

A general object of the invention is to provide improved membrane separation assemblies.

A more specific objective of the invention is to overcome one or more of the problems described above.

The general object of the invention can be attained, at least in part, through an assembly for use in separation of a fluid feed via at least one membrane separation element. In accordance with one preferred embodiment of the invention, such an assembly includes an elongated housing having opposed first and second ends. The housing also has at least one fluid feed stream inlet, at least one residual stream outlet and at least one permeate stream outlet. The housing contains at least one membrane separation element to form a membrane separation element linear string having opposed first and second ends. The membrane separation element linear string at least in part defines a linear permeate passage tube having opposed first and second ends. The assembly also includes a first permeate adapter joined with the first end of the linear permeate passage tube. The first permeate adapter has a first face portion, an oppositely disposed first back portion and a first body portion extending between the first face portion and the first back portion. The first face portion includes a first receiving opening for receiving the first end of the linear permeate passage tube. The first body portion defines a first permeate passageway extending therethrough. The first body portion includes a first plurality of permeate discharge openings disposed therein and in fluid communication with a first permeate stream outlet. The first permeate passageway places the first receiving opening and the first plurality of permeate discharge openings in fluid flow communication.

The prior art generally fails to provide membrane separation assemblies that permit permeate removal from a location other than the end center of the tube. Moreover, the prior art generally fails to provide membrane separation assemblies that permit permeate removal from both ends of a membrane string. Further, the prior art generally fails to provide membrane separation assemblies that permit permeate removal from one or more desired locations intermediate to the ends of the tube.

The invention further comprehends an improved membrane assembly for use in gas separation. Such a membrane assembly includes at least one elongated membrane pressure tube having at least one feed stream gas inlet, at least one residual stream gas outlet and at least one permeate stream outlet. The at least one elongated membrane pressure tube contains a string of spiral wound membrane separation elements composed of a plurality of spiral wound membrane separation elements formed in a linear string. The string of spiral wound membrane separation elements at least in part defines a linear permeate passage tube having opposed first and second ends. The improved membrane assembly, in accordance with one preferred embodiment of the invention, includes a first permeate adapter joined with the first end of the linear permeate passage tube and a second permeate adapter joined with the second end of the linear permeate passage tube.

The first permeate adapter has a first face portion including a first receiving opening for receiving the first end of the linear permeate passage tube. The first permeate adapter also has a first body portion extending from the first face portion oppositely the linear permeate passage tube. The first body portion defines a first permeate passageway extending therethrough. The first body portion includes a first plurality of permeate discharge openings disposed therein. The first permeate passageway places the first receiving opening and the first plurality of permeate discharge openings in fluid flow communication.

The second permeate adapter has a second face portion including a second receiving opening for receiving the second end of the linear permeate passage tube. The second body portion defines a second permeate passageway extending therethrough. The second body portion includes a second plurality of permeate discharge openings disposed therein and in fluid communication with a second permeate stream outlet. The second permeate passageway places the second receiving opening and the second plurality of permeate discharge openings in fluid flow communication.

The invention still further comprehends a double permeate draw membrane assembly for use in separation of a fluid feed via at least one membrane separation element. In accordance with one preferred embodiment of the invention, such a double permeate draw membrane assembly includes an elongated housing having opposed first and second ends. The housing also has at least one fluid feed stream inlet, at least one residual stream outlet and a first and a second permeate stream outlet. The housing contains at least one membrane separation element to form a membrane separation element linear string. The membrane separation element linear string at least in part defines a linear permeate passage tube having opposed first and second ends.

The double permeate draw membrane assembly also includes a first permeate adapter joined with the first end of the linear permeate passage tube. The first permeate adapter has a first face portion, an oppositely disposed first back portion and a first body portion extending between the first face portion and the first back portion. The first face portion includes a first receiving opening for receiving the first end of the linear permeate passage tube. The first body portion defines a first permeate passageway extending therethrough. The first body portion includes a first plurality of permeate discharge openings disposed therein and in fluid communication with the first permeate stream outlet. The first permeate passageway places the first receiving opening and the first plurality of permeate discharge openings in fluid flow communication.

The double draw membrane assembly also includes a second permeate adapter joined with the second end of the linear permeate passage tube. The second permeate adapter has a second face portion, an oppositely disposed second back portion and a second body portion extending between the second face portion and the second back portion. The second face portion includes a second receiving opening for receiving the second end of the linear permeate passage tube. The second body portion defines a second permeate passageway extending therethrough. The second body portion includes a second plurality of permeate discharge openings disposed therein and in fluid communication with the second permeate stream outlet. The second permeate passageway places the second receiving opening and the second plurality of permeate discharge openings in fluid flow communication.

Other objects and advantages will be apparent to those skilled in the art from the following detailed description taken in conjunction with the appended claims and drawings.

DETAILED DESCRIPTION OF THE INVENTION

The present invention provides an improved assembly for use in separation of a fluid feed via a plurality of membrane separation elements. As described in greater detail below, the invention provides improved membrane separation assemblies that permit permeate removal from a location other than the end center of the tube. Moreover, in accordance with certain preferred embodiments, the invention provides membrane separation assemblies that permit permeate removal from both ends of a membrane string. Further, in accordance with certain preferred embodiments, the invention provides membrane separation assemblies that permit permeate removal from one or more desired locations intermediate to the ends of the tube.

Figure 1:
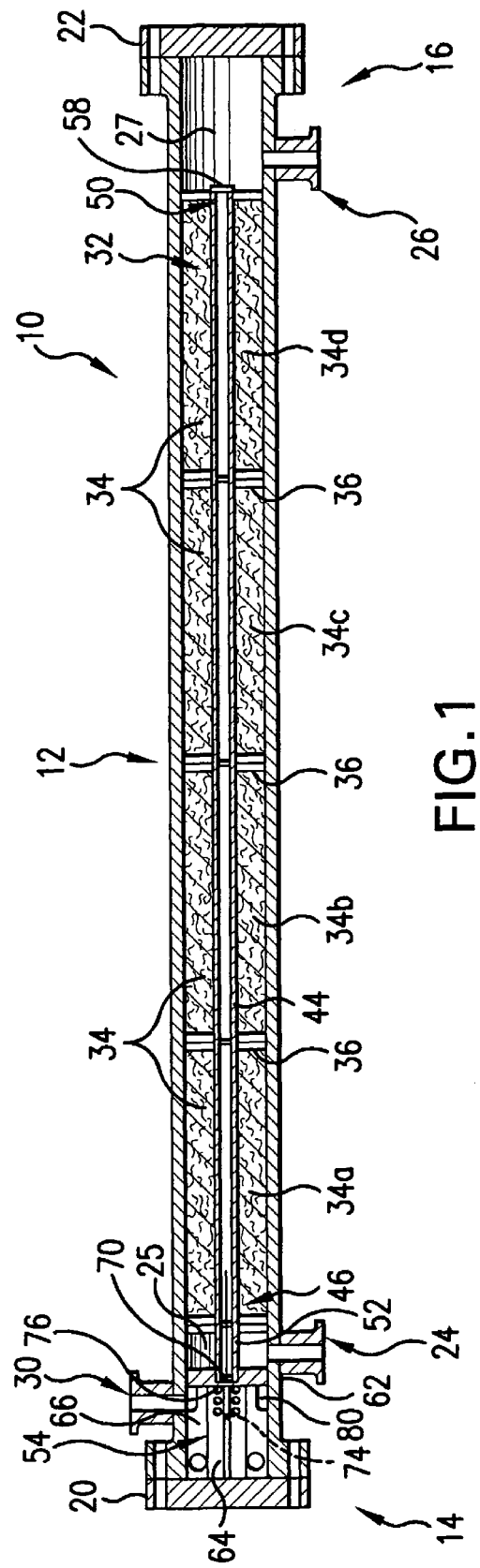
FIG. 1 is a simplified cross sectional view of a membrane assembly in accordance with one embodiment of the invention.
Figure 2:
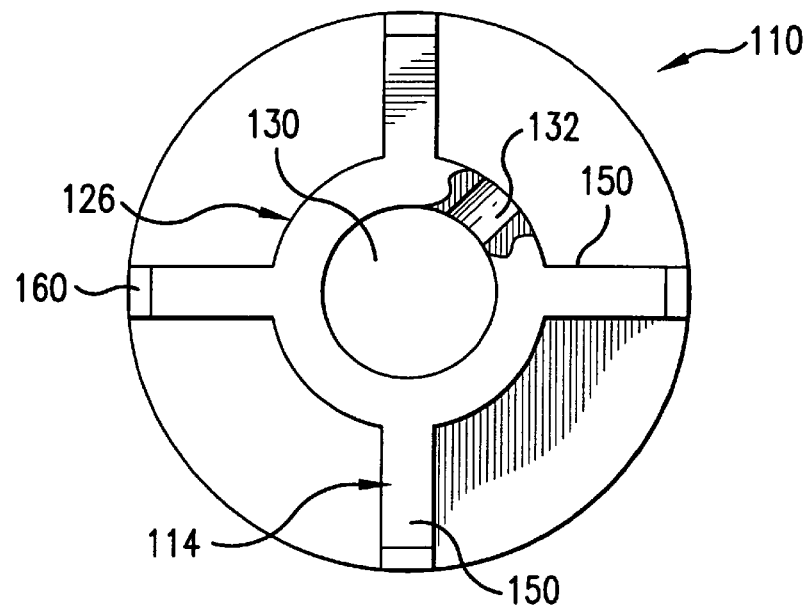
FIG. 2 is a top view, partially in section, of a permeate adapter in accordance with one embodiment of the invention.

Those skilled in the art and guided by the teachings herein provided will appreciate that the present invention may be practiced or embodied by, in or with membrane separation assemblies having a variety of different structures. As representative, FIG. 1 illustrates a simplified membrane assembly, generally designated by the reference numeral 10, in accordance with one embodiment of the invention. The membrane assembly 10 of FIG. 1 has been simplified to facilitate illustration and understanding and does not in detail show various membrane assembly internals such as including various gaskets, seals and the like. As will be appreciated, such membrane assembly internals are generally well known in the art and do not generally form limitations on the broader practice of the invention.

While membrane assemblies in accordance with the invention may find various uses, the invention is believed to have particular utility for use in or with the separation of carbon dioxide from natural gas. It is to be understood, however, that the broader practice of the invention is not necessarily limited to use for the separation of carbon dioxide from natural gas as other fluid separations such as including other gas separations such as noncryogenic separation of air such as to form nitrogen gas and oxygen gas; hydrogen-hydrocarbon separations; separation of hydrogen gas from carbon oxides such as carbon monoxide and/or carbon dioxide, for example, as well as liquid separations such as involving reverse osmosis processing, for example, can, if desired, also be practiced employing membrane assemblies in accordance with the invention. In addition, separations involving nanofiltration or microfiltration can be practiced using membrane assemblies in accordance with the invention.

Returning to the FIG. 1, the membrane assembly 10 includes a containment vessel 12. The containment vessel 12 is suitably in the form of an elongated housing having a generally cylindrical or tubular cylindrical outline. Thus, the containment vessel 12 is sometimes hereinafter referred to as a membrane pressure tube.

Those skilled in the art and guided by the teachings herein provided will appreciate that containment vessels in accordance with the invention can be constructed from various suitable materials, such as various metals, metal alloys, or composite materials such as fiber reinforced polymers, desirably at least relatively inert to the processing stream materials passing therethrough. For example, aluminum, as a relatively light weight metal, is a preferred material of construction in accordance with one embodiment of the invention. Alternatively, containment vessels in accordance with the invention can be constructed non-metallic materials such as filament wound vessels, such as constructed of carbon fiber or glass fiber, for example.

The containment vessel 12 has opposed first and second ends, 14 and 16, respectively. Each of the ends 14 and 16 is closed to the atmosphere such as by way of a respective blind flange, 20 and 22, and such as forms a solid end cover at each of the ends 14 and 16, respectively.

The containment vessel 12 includes a fluid feed stream inlet or port 24 adjacent or near the containment vessel first end 14 and such as to form a feed reservoir 25 within the containment vessel 12. The containment vessel 12 also includes a residual stream outlet or port 26 adjacent or near the containment vessel second end 16 and such as to form a residual reservoir 27 within the containment vessel 12. The containment vessel 12 also includes a permeate stream outlet or port 30 adjacent or near the containment vessel first end 14.

Those skilled in the art and guided by the teachings herein provided will appreciate that the permeate stream outlet or port 30 can desirably be disposed at a selected location anywhere about the circumference of the containment vessel 12 and radially extending therefrom, such as shown in FIG. 1. In particular, FIG. 1 shows the permeate stream outlet or port 30 as perpendicularly extending adjacent the containment vessel first end 14.

The containment vessel 12 houses or otherwise effectively contains a string 32 of membrane separation elements, generally designated by the reference numeral 34. In the membrane assembly 10, the membrane separation elements 34 are individually designated as first, second, third and fourth membrane separation elements and by the reference numerals 34a, 34b, 34c and 34d, respectively, and such as joined sequentially by a clamp or other selected connection or coupling, such as designated by the reference numeral 36. In practice, the membrane separation element string 32 is generally composed of at least one membrane separation element 34 formed in a linear string having opposed first and second ends, 40 and 42, respectively. Moreover, while the membrane separation element string 32 is shown as including four (4) membrane separation elements 34, it will be understood by those skilled in the art and guided by the teachings herein provided that membrane separation element strings in accordance with the invention generally can include at least one but preferably two or more membrane separation elements. For example, in accordance with particular embodiments of the invention, the invention can, if desired, be practiced employing membrane separation element strings alternatively composed of 6, 7, 8, 9, 10, 11 or 12 membrane separation elements, with typical membrane separation element strings employing 6 to 10 membrane separation elements. Moreover, those skilled in the art and guided by the teachings herein provided will understand and appreciate that the number of membrane separation elements employed in particular assemblies is generally application dependent and further, a particular system can be unevenly loaded with membrane separation elements such as to facilitate achieving desired stage cuts.

The membrane separation element string 32 at least in part defines a linear permeate passage tube 44 such as generally centrally disposed and longitudinally extending through the membrane separation elements 34. The linear permeate passage tube 44 has or includes opposed first and second ends, 46 and 50, respectively. If desired and as shown, the linear permeate passage tube 44 may include a tube extender 52, also somewhat commonly known as a "stand off tube", such as extending through the feed reservoir 25 and such as to avoid or prevent undesired direct contact between the feed stream materials in the feed reservoir 25 and the permeate materials passing through the permeate passage tube 44.

The membrane assembly 10 further includes a first permeate adapter 54 joined with or to the first end 46 of the linear permeate passage tube 44, e.g., the tube extender 52. The membrane assembly 10 also includes a cap or plug 58 disposed at the second end 50 of the linear permeate passage tube 44 such as to prevent or otherwise avoid undesired contact by or between the permeate and the residual materials.

FIGS. 2-5 illustrate, in greater detail, a permeate adapter 110 accordance with a preferred embodiment of the invention and, as described further herein, advantageously permits or otherwise allows permeate material to be carried out of a membrane pressure tube radially, through the side the elongated assembly rather than through a longitudinal end of the elongated assembly. The permeate adapter 110 has or includes a face portion 112, an oppositely disposed back portion 114 and a body portion 116 extending between the face portion 112 and the back portion 114. The face portion 112 includes a receiving opening 120 for receiving a respective end of an associated permeate passage tube such as the permeate passage tube 44, shown in FIG. 1.

Figure 3:
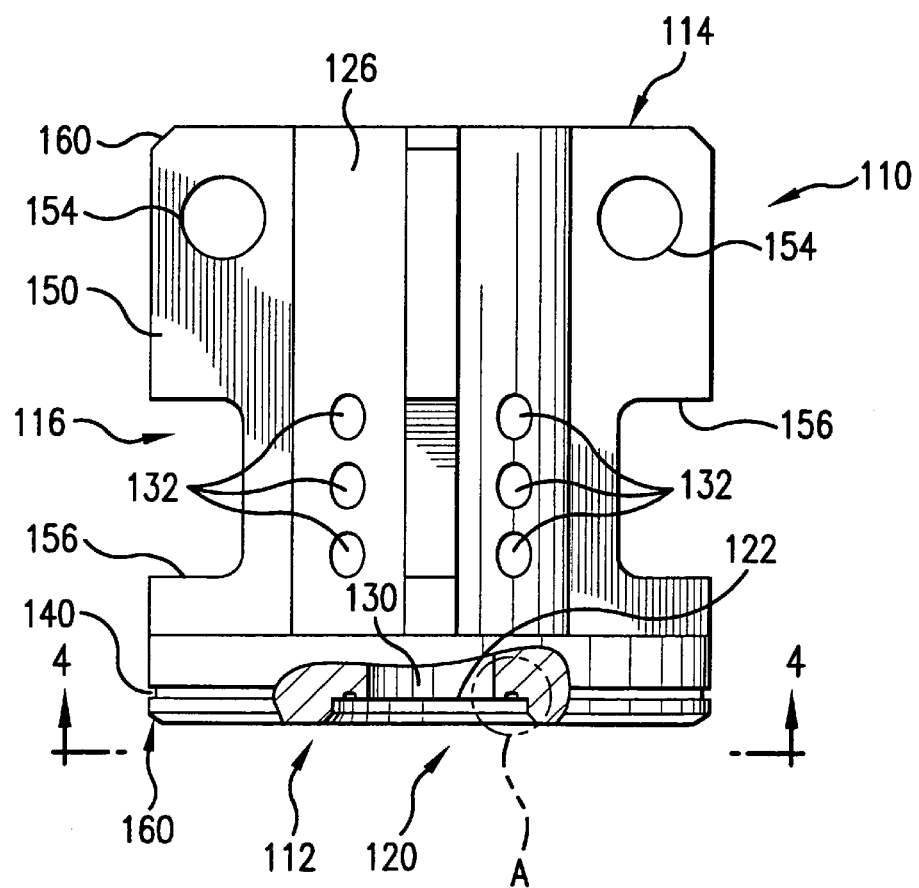
FIG. 3 is a side view, partially in section, of the permeate adapter shown in FIG. 2.
Figure 4:
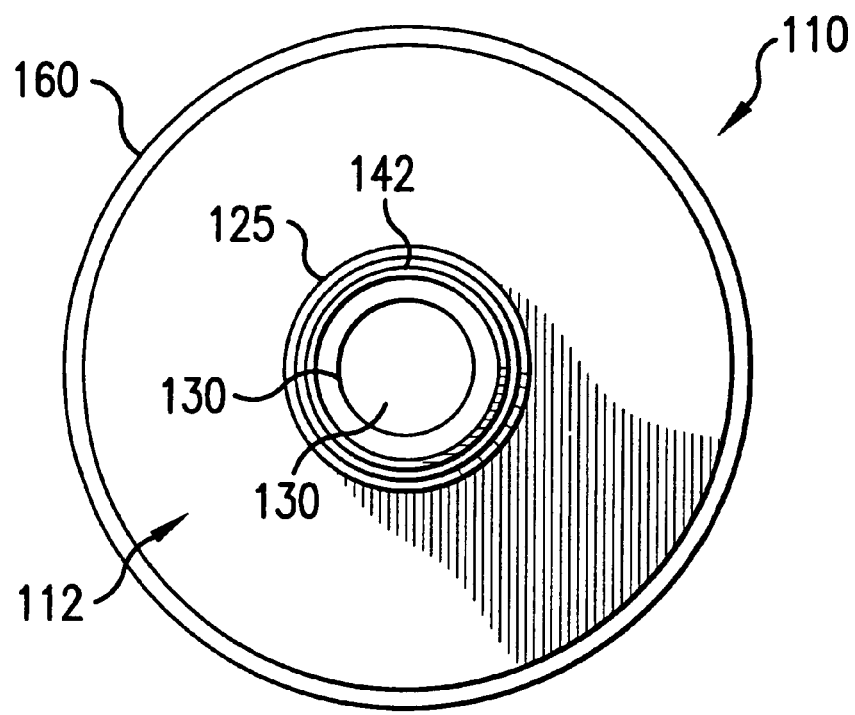
FIG. 4 is an end view of the permeate adapter shown in FIGS. 2 and 3 and taken along the line 4-4 in FIG. 3.
Figure 5:
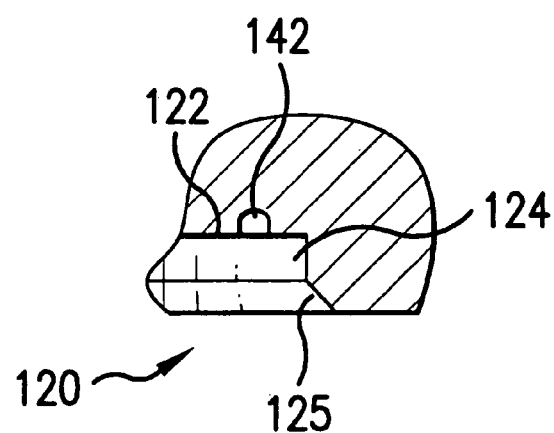
FIG. 5 is an enlarged fragmentary sectional view of the portion of the permeate adapter shown in FIG. 3 encircled with A.

As perhaps best seen by references to FIGS. 3-5, the receiving opening 120 may desirably form or include a back surface 122 and a sidewall 124 such as to facilitate the desirable attachment or placement of an associated permeate passage tube therewith or thereagainst. The receiving opening 120 may also desirably form or include an angled lead-in sidewall 125 such as may serve to facilitate assembly.

Returning to FIGS. 2-5, the body portion 116 of the permeate adapter 110 includes a generally tubular central section 126 that defines a permeate passageway 130 extending therethrough. The body portion 116 includes a plurality of permeate discharge openings 132 disposed therein and in fluid communication with a permeate stream outlet, such as the permeate stream outlet 30 shown in FIG. 1. The permeate passageway 130 serves to place the receiving opening 120 and the plurality of permeate discharge openings 132 in fluid flow communication.

The permeate adapter 110 has or includes four sets of permeate discharge openings 132 (only two of the four sets of permeate discharge openings 132 are visible in FIG. 3) disposed at about 90 degrees from the next adjacent set of permeate discharge openings, with each set of permeate discharge openings composed of three separate permeate discharge openings 132. It is to be understood, however, that the broader practice of the invention is not necessarily limited by or to specific location, placement or number of such discharge openings.

The permeate adapter 110 desirably additionally contains or includes processing expedients such as either or both a seal collar 140 disposed near or adjacent the face portion 112 and a seal groove 142 disposed at or near the receiving opening 120. As will be appreciated by those skilled in the art and guided by the teachings herein provided, such or a similar seal collar or seal shoulder can be utilized in the desired placement and positioning of suitable seals, e.g., O-rings seals, to better ensure maintenance of desired separation of the fluid streams passing through the assembly, e.g., separation of the high pressure fluid feed from the low pressure permeate stream material.

Those skilled in the art and guided by the teachings herein provided will understand and appreciate that, if desired, suitable alternative placement or positioning of such seals can be arranged and provided. For example, in the above-described embodiment, the seal groove 142 is shown as located on the back surface 122 such that an existing flange can rest against it using a large diameter element. Alternatively, however, a seal groove could be located along the side, e.g., along the opening sidewall 124 such as to seal against the outer diameter of a permeate tube rather than a permeate tube end flange.

The permeate adapter 110 may additionally contain or include desired support structures such as support wings 150. In the illustrated embodiment, the permeate adapter 110 is shown as including four support wings 150, generally equally spaced about 90 degrees from the next adjacent support wing. Some or all of the support wings 150 may contain or include desired construction or manufacture expedients such as lifting eyelets, designated by the reference numeral 154, cut outs or slots 156, such as to reduce weight, and/or chamfered edge ends 160 such as to facilitate either or both installation and removal of the permeate adapter.

As will be appreciated by those skilled in the art and guided by the teachings herein provided, permeate adapter in accordance with the invention can desirably serve multiple functions in membrane assemblies of the invention. For example, the permeate adapter of the invention can serve as a structural device that can appropriately react to the forces generated or resulting from the feed to permeate differential pressure, including the forces generated at the receiving opening and those transferred to the permeate adapter by the permeate passage tube.

The permeate adapter of the invention, such as through seals located at or about the perimeter thereof, e.g., the seal collar 140, and at or near the receiving opening, e.g., the seal groove 142, can also serve to desirably separate the high pressure feed and residual materials stream(s) from the low pressure permeate material.

The permeate adapter of the invention can also desirably serve to, at least in part form or create a collection zone for the low pressure permeate material. In addition, the permeate adapter of the invention can serve to restrain the membrane separation element string during start-up when the pressure drop across the membrane elements may normally create forces that exceed those created by the feed to permeate differential pressure. Such restraint can be accomplished various means including, for example, by means of a thread on the permeate pipe or tube, a retaining clip on the adapter or a spring restraint located at either end of the assembly, for example.

Turning back to FIG. 1, the first permeate adapter 54, similar to the permeate adapter 110 shown in FIGS. 2-5, has or includes a first face portion 62, an oppositely disposed first back portion 64 and a first body portion 66 extending between the first face portion 62 and the first back portion 64. As shown, the blind flange 20 is generally disposed adjacent the first back portion 64 of the first adapter 54.

The first face portion 62 includes a first receiving opening 70 for receiving the first end 46 of the linear permeate passage tube 44. As with the permeate adapter 110 described above, the first body portion 66 of the first permeate adapter 54 defines a first permeate passageway 74 extending therethrough. The first body portion 66 includes a first plurality of permeate discharge openings 76 disposed therein and in fluid communication with the first permeate stream outlet 30. The first permeate passageway 74 serves to place the first receiving opening 70 and the first plurality of permeate discharge openings 76 in fluid flow communication.

As shown in FIG. 1, a permeate collection annulus 80 is formed around the first permeate adapter 54 and wherein permeate material discharged through the discharge openings 76 may collect or otherwise temporarily reside until passed to the permeate stream outlet or port 30 adjacent or near the containment vessel first end 14. As will be appreciated by those skilled in the art and guided by the teachings herein provided, such a presence or inclusion of a permeate collection annulus in a membrane assemblies in accordance with the invention can dramatically simplify and facilitate the placement and location of the permeate stream outlet 30 at various particular orientations such as may be desired for particular applications.

In operation, such as upon the occurrence of a fluid feed from which one or more components or constituent is desired to be separated, such a fluid feed is introduced at elevated pressure into the membrane assembly 10 through the fluid feed stream inlet or port 24 adjacent or near the containment vessel first end 14 and such as to form a feed reservoir 25 within the containment vessel 12. In practice, operating pressures for such assemblies are typically in a range of about 690 to about 13790 kPa (100 to 2000 psig), dependent on the particular application. For example, in processing natural gas, operating pressures in the range of about 4137 to about 10342 kPa (600 to 1500 psig) are common. In processing hydrogen gas, operating pressures in the range of about 8274 to about 13790 kPa (1200 to 2000 psig) are common.

The membrane assembly 10 acts on the feed to form permeate material and residual material. The residual material is communicated through the membrane separation elements 34 to the residual reservoir 27 and subsequently out of the assembly 10 through the residual stream outlet or port 26.

The permeate material is communicated through the permeate passage tube 44 to the first permeate adapter 54. The permeate material is communicated through the first permeate passageway 74 and out through the permeate discharge opening 76 into the permeate collection annulus 80 and ultimately out through the permeate stream outlet 30.

Those skilled in the art and guided by the teachings herein provided will appreciate various significant advantages provided or resulting from such membrane assemblies in accordance with the invention. For example, such membrane assemblies in accordance with the invention desirably avoid the inclusion or presence of piping connections at or from the end flanges of the assembly. By placing the membrane assembly piping on the side rather than extending from the end of an assembly the piping connected to the membrane assembly housing can desirably be welded rather than rely on flanged connections. Welded connections are preferred especially when hazardous components such as hydrogen sulfide may be present in high concentrations. Moreover, in the event of an array of such membrane assemblies, such side piping connections permit the creation of a permeate header, joining the membrane assemblies of the array, to be disposed externally adjacent the membrane housing rather than axially extending from the either or both opposite longitudinal ends of the membrane housing. Thus, the invention permits or facilitates a skid composed of a plurality of such membrane assemblies to either or both be made shorter, such as may more readily meet or satisfy restrictive shipping or placement constraints, or incorporate and use longer tube assemblies, for example. Such factors can be very important in applications such as off-shore platforms where transport and the area of the assembly footprint can be critical factors. Consequently, the invention can significantly reduce the costs associated with a skid required to provide a particular product flow rate.

As will be appreciated, ensuring proper alignment of permeate headers with flange connections on a membrane pressure tube for field locations can be a troublesome burden involving significant costs and substantial amounts of time. By placing the membrane assembly piping on the side rather than extending from the end of an assembly the invention permits maintenance and replacement of membrane separation elements from the housing without requiring the removal of the permeate header. Thus the invention can not only serve to reduce the amount of time required to load a membrane skid and/or to replace membrane elements therein but may also desirably serve to reduce the costs associated with skid manufacture and production as, for example, the piping layouts and the fabrication thereof can be significantly simplified.

Still further, the placement of the permeate adapter 54 in the membrane assembly 10 desirably serve as a safety check for the assembly. For example, a safety concern normally associated with membrane assemblies is the possibility of a high pressure gas trapped in the pressure vessel. An operator could incorrectly assume that zero permeate pressure indicates that the pressure vessel is depressurized and is thus safe to open. The loosening of the end flanges could then result in a potentially dangerous ejection of mechanical components from the pressure vessel. However, upon the loosening of the end flange with an assembly in accordance with the invention, the presence of such trapped gas would normally produce movement of the permeate adapter such as to permit venting of the trapped gas through the permeate port such as to safely equalize the pressure on the adapter.

Moreover, as critical forces within the membrane pressure tube can be significantly reduced through practice of the invention, the invention more readily allows or permits the use of larger diameter membrane separation elements.

Still further and as described in greater detail below, as the invention frees the location or placement of the permeate connections from the end of the elongated housing, the invention permits the removal of permeate material from selected locations along the housing length and thus affords a designer various processing option heretofore not readily available or realizable.

Figure 6:
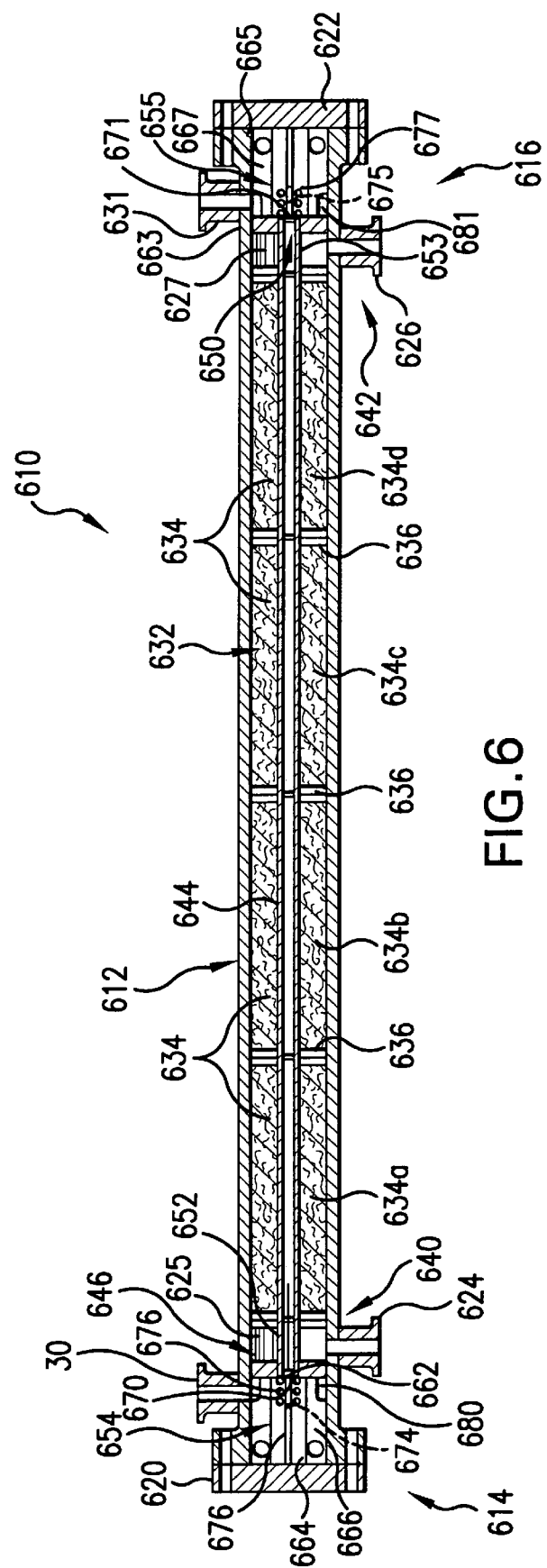
FIG. 6 is a simplified cross sectional view of a membrane assembly in accordance with another embodiment of the invention.

Turning now to FIG. 6, there is illustrated a simplified membrane assembly, generally designated by the reference numeral 610, in accordance with another embodiment of the invention. The membrane assembly 610 of FIG. 6, similar to the membrane assembly 10 shown in FIG. 1, has been simplified to facilitate illustration and understanding and does not in detail show various membrane assembly internals such as including various gaskets, seals and the like. As will be appreciated, such membrane assembly internals are generally well known in the art and do not generally form limitations on the broader practice of the invention.

The membrane assembly 610 includes a containment vessel 612. The containment vessel 612 is suitably in the form of an elongated housing having a generally cylindrical or tubular cylindrical outline and is sometimes hereinafter referred to as a membrane pressure tube. The containment vessel 612 has opposed first and second ends, 614 and 616, respectively. Each of the ends 614 and 616 is closed to the atmosphere such as by way of a respective blind flange, 620 and 622, and as such forms a solid end cover at each of the ends 614 and 616, respectively.

The containment vessel 612 includes a first end port 624 adjacent or near the containment vessel first end 614 and such as to form a first end reservoir 625 within the containment vessel 612. The containment vessel 612 also includes a second end port 626 adjacent or near the containment vessel second end 616 and such as to form a second end reservoir 627 within the containment vessel 612.

The membrane assembly 610, similar to the membrane assembly 10 described above, has or includes a first end permeate stream outlet or port 630 adjacent or near the containment vessel first end 614. As will be described in greater detail below, the membrane assembly 610, however, differs primarily from the membrane assembly 10 described above by the presence or inclusion of a second end permeate stream outlet or port 631 adjacent or near the containment vessel second end 616. Thus, a membrane assembly such as the membrane assembly 610 is sometimes referred to as a "double permeate draw" membrane assembly.

As will be appreciated by those skilled in the art and guided by the teachings herein provided, in such a double permeate draw membrane assembly, either the first end port 624 or the second end port 626 can serve as a feed port while the other of the first end port 624 and the second end port 626 can serve as a residual stream port or outlet, with the first end reservoir 625 and the second end reservoir 627 appropriately correspondingly serving as either a feed reservoir or a residual reservoir.

The containment vessel 612, similar to the containment vessel 12 of the membrane assembly 10 described above, houses or otherwise effectively contains a string 632 of membrane separation elements, generally designated by the reference numeral 634. In the membrane assembly 610, the membrane separation elements 634 are individually designated as first, second, third and fourth membrane separation elements and by the reference numerals 634a, 634b, 634c and 634d, respectively, and such as joined sequentially by a clamp or other selected connection or coupling, such as designated by the reference numeral 636. In practice, the membrane separation element string 632 is generally composed of at least one membrane separation element 634 formed in a linear string having opposed first and second ends, 640 and 642, respectively. Moreover, while the membrane separation element string 632 is shown as including four (4) membrane separation elements 634, as with the membrane separation element string 32 described above, it will be understood by those skilled in the art and guided by the teachings herein provided that membrane separation element strings in accordance with the invention will generally include at least one but preferably will include at least two or more membrane separation elements.

The membrane separation element string 632 at least in part defines a linear permeate passage tube 644 such as generally centrally disposed and longitudinally extending through the membrane separation elements 634. The linear permeate passage tube 644 has or includes opposed first and second ends, 646 and 650, respectively. If desired and as shown, the linear permeate passage tube 644 may include a first end tube extender or stand off tube 652, such as extending through the first end reservoir 625, and a second end tube extender or stand off tube 653, such as extending through the second end reservoir 627, with such tube extenders desirably serving to avoid or prevent undesired direct contact between feed stream materials and residual materials in the appropriate corresponding reservoirs 625 and 627 and the permeate materials passing through the permeate passage tube 644.

The membrane assembly 610 further includes a first permeate adapter 654, such as desirably in accordance with the invention, joined with or to the first end 646 of the linear permeate passage tube 644, e.g., the first end tube extender 652. The membrane assembly 610 still further includes a second permeate adapter 655, such as also desirably in accordance with the invention, joined with or to the second end 650 of the linear permeate passage tube 644, e.g., the second end tube extender 653.

The first permeate adapter 654, similar to the permeate adapter 54 described above, has or includes a first face portion 662, an oppositely disposed first back portion 664 and a first body portion 666 extending between the first face portion 662 and the first back portion 664. The first face portion 662 includes a first receiving opening 670 for receiving the first end 646 of the linear permeate passage tube 644. As with the permeate adapter 110 described above, the first body portion 666 of the first permeate adapter 654 defines a first permeate passageway 674 extending therethrough. The first body portion 666 includes a first plurality of permeate discharge openings 676 disposed therein and in fluid communication with the first end permeate stream outlet 630. The first permeate passageway 674 serves to place the first receiving opening 670 and the first plurality of permeate discharge openings 676 in fluid flow communication.

A permeate collection annulus 680 is formed around the first permeate adapter 654 and wherein permeate material discharged through the discharge openings 676 may collect or otherwise temporarily reside until passed to the permeate stream outlet or port 630 adjacent or near the containment vessel first end 614. As will be appreciated by those skilled in the art and guided by the teachings herein provided, such a presence or inclusion of a permeate collection annulus in a membrane assemblies in accordance with the invention can dramatically simplify and facilitate the placement and location of the first end permeate stream outlet 630 at various particular orientations such as may be desired for particular applications.

The second permeate adapter 655 similarly also has or includes a second face portion 663, an oppositely disposed second back portion 665 and a second body portion 667 extending between the second face portion 663 and the second back portion 665. The second face portion 663 includes a second receiving opening 671 for receiving the second end 650 of the linear permeate passage tube 644. As with the permeate adapter 110 described above, the second body portion 667 of the second permeate adapter 655 defines a second permeate passageway 675 extending therethrough. The second body portion 667 includes a second plurality of permeate discharge openings 677 disposed therein and in fluid communication with the second end permeate stream outlet 631. The second permeate passageway 675 serves to place the second receiving opening 671 and the second plurality of permeate discharge openings 677 in fluid flow communication.

Also, similarly, a permeate collection annulus 681 is formed around the second permeate adapter 655 and wherein permeate material discharged through the discharge openings 677 may collect or otherwise temporarily reside until passed to the second end permeate stream outlet or port 631 adjacent or near the containment vessel second end 616. As will be appreciated by those skilled in the art and guided by the teachings herein provided, such a presence or inclusion of a permeate collection annulus in a membrane assemblies in accordance with the invention can dramatically simplify and facilitate the placement and location of the second end permeate outlet 631 at various particular orientations such as may be desired for particular applications.

Moreover, those skilled in the art and guided by the teachings herein provided will further appreciate that the first and second end permeate outlets 630 and 631 can be disposed at the same or different angles relative the containment vessel 612, as may be desired in particular applications.

As will be appreciated by those skilled in the art and guided by the teachings herein provided, when the permeate flow rate is high in a string of membrane separation elements, the permeate pressure drop can be significantly reduce though the application of embodiments such as described above wherein the permeate flow can be removed from both ends of a membrane separation element string. In view thereof, practice of the invention is believed to be particularly attractive in connection with separations such as involving natural gas having a high concentration of carbon dioxide in the feed gas.

Still further, such a double permeate draw system allows a floating membrane separation element string as practice of the invention desirably avoids or eliminates inducing a significant axial forces such as due to differential pressures between the feed and the permeate materials. Consequently, the invention can more readily permit the use of larger diameter permeate tubes.

Figure 7:
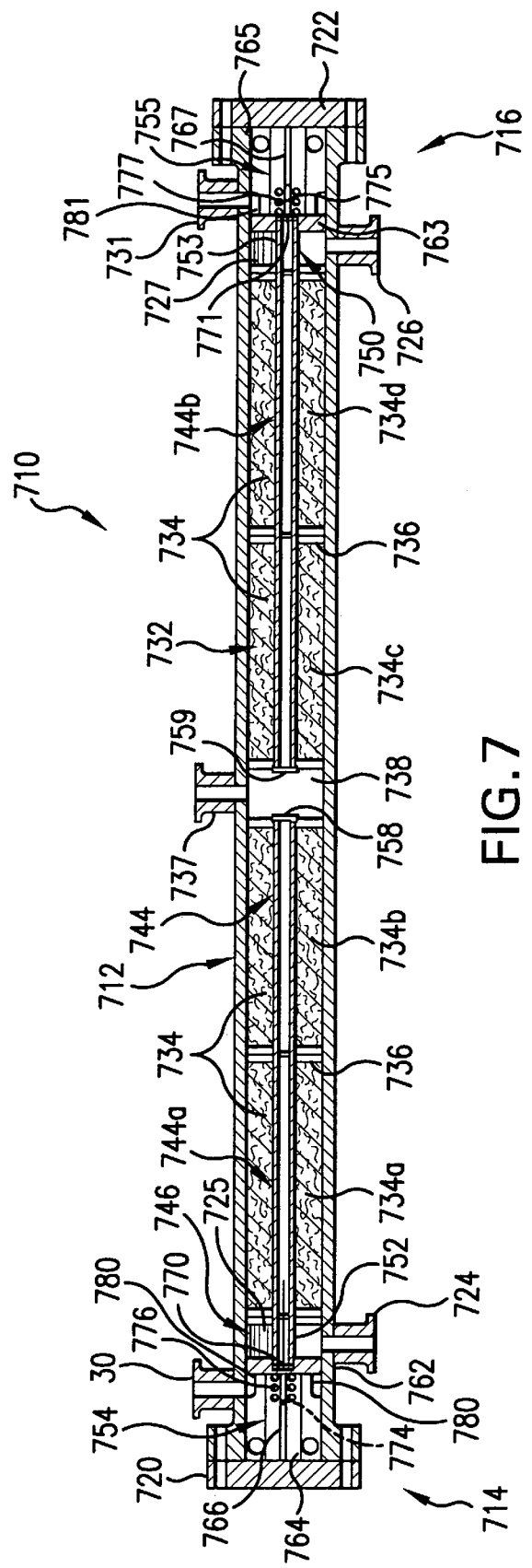
FIG. 7 is a simplified cross sectional view of a membrane assembly in accordance with yet another embodiment of the invention.

Turning now to FIG. 7, there is illustrated a simplified membrane assembly, generally designated by the reference numeral 710, in accordance with another embodiment of the invention. The membrane assembly 710 shown in FIG. 7 is generally similar to the membrane assembly 610 shown in FIG. 6 and includes a containment vessel 712 having opposed first and second ends, 714 and 716, respectively. Each of the ends 714 and 716 is closed to the atmosphere such as by way of a respective blind flange, 720 and 722, and such as forms a solid end cover at each of the ends 714 and 716, respectively.

The containment vessel 712 includes a first end port 724 adjacent or near the containment vessel first end 714 and such as to form a first end reservoir 725 within the containment vessel 712. The containment vessel 712 also includes a second end port 726 adjacent or near the containment vessel second end 716 and such as to form a second end reservoir 727 within the containment vessel 712.

The membrane assembly 710 has or includes a first end permeate stream outlet or port 730 adjacent or near the containment vessel first end 714. The membrane assembly 710 also has or includes a second end permeate stream outlet or port 731 adjacent or near the containment vessel second end 716. Such a membrane assembly is sometimes referred to as composed or containing two single draw permeates.

The containment vessel 712, similar to the containment vessel 612 of the membrane assembly 610 described above, houses or otherwise effectively contains a string 732 of membrane separation elements, generally designated by the reference numeral 734. In the membrane assembly 710, the membrane separation elements 734 are individually designated as first, second, third and fourth membrane separation elements and by the reference numerals 734a, 734b, 734c and 734d, respectively, and such as joined sequentially by a clamp or other selected connection or coupling, such as designated by the reference numeral 736.

The membrane assembly 710, however, primarily differs from the membrane assembly 610 described above by the presence or inclusion of a central port 737 such as centrally disposed between two of the membrane separation elements 734 forming the membrane separation element linear string 732 and such as to form a central reservoir 738. In the illustrated embodiment, the central port 737 is positioned between the membrane separation element 734b and the membrane separation element 734c.

As will be appreciated by those skilled in the art and guided by the teachings herein provided, such a membrane assembly having a central port allows or otherwise permits various processing options heretofore not readily realizable. For example, the membrane assembly 710 can, if desired, be operated in a fashion wherein the end ports 724 and 726 are utilized as feed ports and the central port 737 is utilized as a residual port. Alternatively, the central port 737 can be utilized as a feed port and the end ports 724 and 726 utilized as residual ports.

The membrane separation element string 732 at least in part defines a linear permeate passage tube 744 such as generally centrally disposed and longitudinally extending through the membrane separation elements 734. The linear permeate passage tube 744 includes a first end portion 744a and a second end portion 744b. The linear permeate passage tube 744 also has or includes opposed first and second ends, 746 and 750, respectively. If desired and as shown, the linear permeate passage tube 744 may include a first end tube extender or stand off tube 752, such as extending through the first end reservoir 725, and a second end tube extender or stand off tube 753, such as extending through the second end reservoir 727, with such tube extenders desirably serving to avoid or prevent undesired direct contact between feed stream materials and residual materials in the appropriate corresponding reservoirs 725 and 727 and the permeate materials passing through the permeate passage tube 744.

The membrane assembly 710 further includes a first permeate adapter 754, such as desirably in accordance with the invention, joined with or to the first end 746 of the linear permeate passage tube 744, e.g., the first end tube extender 752. The membrane assembly 710 still further includes a second permeate adapter 755, such as also desirably in accordance with the invention, joined with or to the second end 750 of the linear permeate passage tube 744, e.g., the second end tube extender 753.

The membrane assembly 710 also includes a first cap or plug 758 joined to or connected with the first end 746 of the linear permeate passage tube 744 adjacent the central reservoir 738 and a second cap or plug 759 joined to or connected with the second end 750 of the linear permeate passage tube 744 adjacent the central reservoir 738.

The first permeate adapter 754, similar to the permeate adapter 54 described above, has or includes a first face portion 762, an oppositely disposed first back portion 764 and a first body portion 766 extending between the first face portion 762 and the first back portion 764. The first face portion 762 includes a first receiving opening 770 for receiving the first end 746 of the linear permeate passage tube 744. The first body portion 766 of the first permeate adapter 754 defines a first permeate passageway 774 extending therethrough. The first body portion 766 includes a first plurality of permeate discharge openings 776 disposed therein and in fluid communication with the first end permeate stream outlet 760. The first permeate passageway 774 serves to place the first receiving opening 770 and the first plurality of permeate discharge openings 776 in fluid flow communication.

A permeate collection annulus 780 is formed around the first permeate adapter 754 and wherein permeate material discharged through the discharge openings 776 may collect or otherwise temporarily reside until passed to the permeate stream outlet or port 730 adjacent or near the containment vessel first end 714. As will be appreciated by those skilled in the art and guided by the teachings herein provided, such a presence or inclusion of a permeate collection annulus in a membrane assemblies in accordance with the invention can dramatically simplify and facilitate the placement and location of the first end permeate stream outlet 730 at various particular orientations such as may be desired for particular applications.

The second permeate adapter 755 similarly also has or includes a second face portion 763, an oppositely disposed second back portion 765 and a second body portion 767 extending between the second face portion 763 and the second back portion 765. The second face portion 763 includes a second receiving opening 771 for receiving the second end 750 of the linear permeate passage tube 744. The second body portion 767 of the second permeate adapter 755 defines a second permeate passageway 775 extending therethrough. The second body portion 767 includes a second plurality of permeate discharge openings 777 disposed therein and in fluid communication with the second end permeate stream outlet 731. The second permeate passageway 775 serves to place the second receiving opening 771 and the second plurality of permeate discharge openings 777 in fluid flow communication.

Also, similarly, a permeate collection annulus 781 is formed around the second permeate adapter 755 and wherein permeate material discharged through the discharge openings 777 may collect or otherwise temporarily reside until passed to the second end permeate stream outlet or port 731 adjacent or near the containment vessel second end 716. As will be appreciated by those skilled in the art and guided by the teachings herein provided, such a presence or inclusion of a permeate collection annulus in a membrane assemblies in accordance with the invention can dramatically simplify and facilitate the placement and location of the second end permeate stream outlet 731 at various particular orientations such as may be desired for particular applications.

The membrane assemblies 10, 610 and 710, shown in FIGS. 1, 6 and 7, respectively, illustrate particular embodiments of the invention such as to provide different flow options while employing the same basic tube length and assembly connections. As will be appreciated, neither the pressure vessel diameter nor the size or location of the side ports generally form limitations on the broader practice of the invention.

Those skilled in the art and guided by the teachings herein provided will appreciate that membrane assemblies in accordance with the invention can be designed to accommodate standard-sized membrane separation elements, such as membrane separation elements, alternatively, 2, 4, 6 and 8 inches in diameter and typically 40 inches in length. Moreover, if desired, membrane assemblies in accordance with the invention can be designed to accommodate enlarged membrane separation elements, such as membrane separation elements 11.5 inches in diameter or larger, such as membrane separation elements 13.5, 16 or even 40 inches in diameter.

Figure 8:
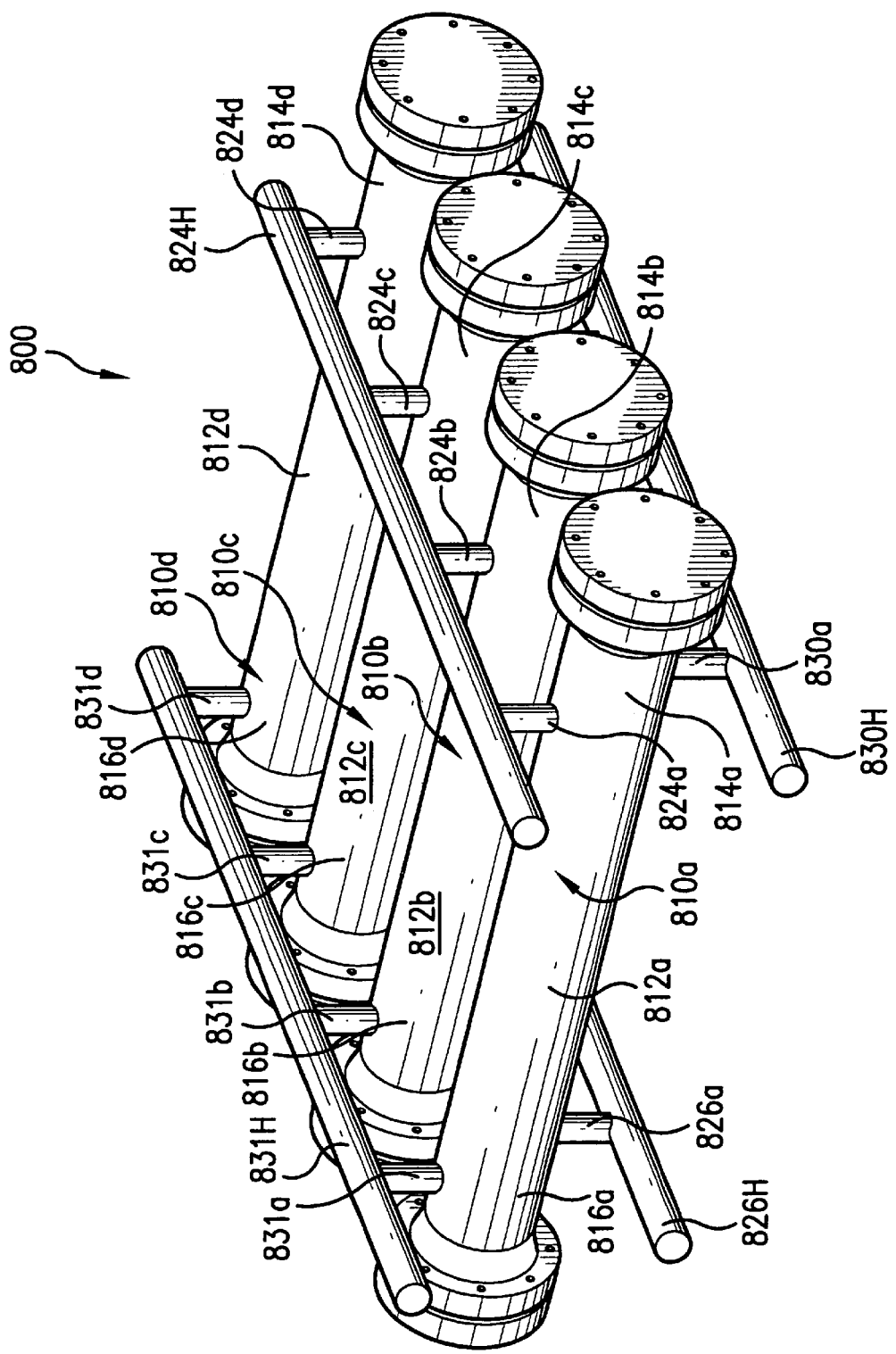
FIG. 8 is a simplified fragmentary perspective view of an array composed of a plurality of membrane assemblies in accordance with one embodiment of the invention.

To further highlight more particularly at least some of the benefits of the invention, reference is now made to FIG. 8 which illustrates an array, particularly a portion of an array generally designated by the reference numeral 800, composed of a plurality of membrane assemblies in accordance with the invention and such as described above, and FIG. 9 which illustrates an array, particularly a portion of an array generally designated by the reference numeral 900, composed of a plurality of membrane assemblies in general accordance with the prior art.

More particularly, membrane assembly array 800 is generally composed of a plurality of the assemblies, such as similar to the double permeate draw membrane assembly 610, described above, and such as connected in parallel, where such membrane assemblies are individually designated by the reference identifiers 810a, 810b, 810c and 810d. While the membrane assembly array portion 800 shown in FIG. 8 is shown as including four membrane assemblies, those skilled in the art and guided by the teachings herein provided will appreciate that membrane assembly arrays in accordance with the invention can be fabricated with any appropriately selected number of membrane assemblies of the invention.

Each of the membrane assemblies 810*a-d* includes a containment vessel elongated housing 812*a-d*, each respectively having a first end 814*a-d* and a second end 816*a-d*. Each of the membrane assemblies 810*a-d* also includes or has a feed port 824*a-d*, respectively, and such as commonly joined with or connected to a feed header 824H. The membrane assemblies 810*a-d* also each includes or has a residual port (only residual port 826*a* for membrane assembly 810*a* is shown in FIG. 8) and such as commonly joined with or connected to a residual header 826H. The membrane assemblies 810*a-d* further each includes or has a first end permeate stream outlet or port (only first end permeate stream port 830*a* for membrane assembly 810*a* is shown in FIG. 8) and such as commonly joined with or connected to a first end permeate header 830H. Each of the membrane assemblies 810*a-d* also includes or has a second end permeate stream outlet or port (individually designated by the reference identifiers 831*a*, 831*b*, 831*c* and 831*d*) and such as commonly joined with or connected to a second end permeate header 831H. As shown, at least one and preferably both the first end permeate header 830H and the second end permeate header 831H is disposed externally adjacent the elongated housings 812*a-d* between the opposed elongated housing first ends 814*a-d*, respectively, and elongated housing second ends 816*a-d*, respectively.

Figure 9:
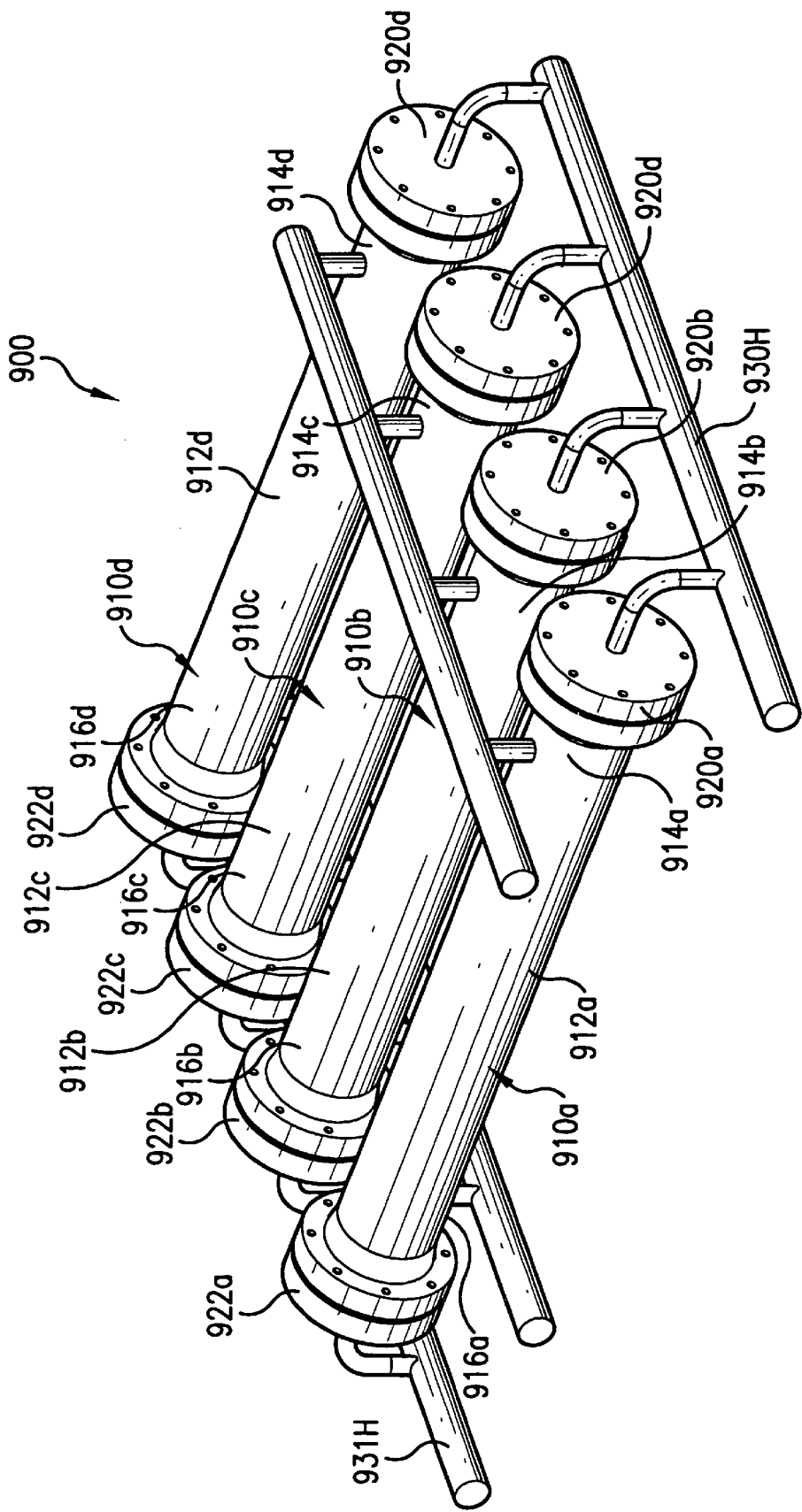
FIG. 9 is a simplified fragmentary perspective view of an array composed of a plurality of membrane assemblies in accordance with the prior art.

Such an arrangement is in sharp contrast to the membrane assembly array 900 shown in FIG. 9 wherein each prior art membrane assembly 910*a-d* is joined or connected in parallel but wherein oppositely disposed first and second end permeate headers 930H and 931H extend through a corresponding end closure 920*a-d* and 922*a-d*, respectively, rather than being disposed externally adjacent the elongated housings 912*a-d* between the opposed elongated housing first ends 914*a-d* and elongated housing second ends 916*a-d*.

As described above, the invention incorporates a permeate adapter that allows permeate to be transmitted or communicated from an elongated assembly from the side rather than from one of the oppositely disposed longitudinal ends. Thus, the invention permits multiple flow configurations including single and double permeate draw configurations as well as end or center feed introduction without requiring significant changes to system hardware. Moreover, by avoiding piping at or extending through a corresponding end closure, the assembly of the invention can be manufactured and maintained at reduced cost.

Thus, the invention provides an improved membrane separation assembly for use in the separation of a fluid feed via at least one membrane separation element. As detailed herein, improvements and benefits realizable through the practice of the invention include: provision of a simpler standardized vessel design, an assembly that produces or results in increased packing area for a fixed length of tube or housing, the elimination of piping or flow connections through the end closures of the elongated housing for the membrane elements; improved packaging options at the skid level and increased flexibility regarding flow configurations without requiring significant hardware substitutions.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An assembly for use in separation of a fluid feed via membrane separation elements, the assembly comprising:
   an elongated housing having opposed first and second ends, the housing also having at least one inlet for a fluid feed stream, at least one outlet for a residual stream and at least one outlet for a permeate stream, the housing containing membrane separation elements to form a membrane separation element linear string having opposed first and second ends, the membrane separation element linear string at least in part defining a linear permeate passage tube having opposed first and second ends; and
   a first permeate adapter joined with the first end of the linear permeate passage tube, the first permeate adapter having a first face portion, an oppositely disposed first back portion and a first body portion extending between the first face portion and the first back portion, the first face portion including a first receiving opening for receiving the first end of the linear permeate passage tube, the first body portion defining a first permeate passageway extending therethrough, the first body portion including a first plurality of permeate discharge openings disposed therein and in fluid communication with a first permeate stream outlet, the first permeate passageway placing the first receiving opening and the first plurality of permeate discharge openings in fluid flow communication;
wherein a first fluid feed stream inlet is disposed adjacent the first end of the membrane separation element linear string; and
a second fluid feed stream inlet is disposed adjacent the second end of the membrane separation element linear string and a first residual stream outlet is centrally disposed between two of the membrane separation elements forming the membrane separation element linear string, wherein said membrane separation elements are capable of replacement without removal of said first permeate adapter.

2. The assembly of claim 1 wherein a first residual stream outlet is disposed adjacent the second end of the membrane separation element linear string.

3. The assembly of claim 1 wherein a first residual stream outlet is disposed adjacent the first end of the membrane separation element linear string and a second residual stream outlet is disposed adjacent the second end of the membrane separation element linear string.

4. The assembly of claim 1 wherein a first permeate stream outlet is disposed adjacent to the first permeate adapter and perpendicular to the elongated housing.

5. The assembly of claim 1 additionally comprising a blind flange disposed adjacent the first back portion of the first permeate adapter.

6. The assembly of claim 1 comprising spiral wound membrane separation elements.

7. The assembly of claim 1 wherein the fluid feed is gaseous.

8. The assembly of claim 7 wherein the gaseous fluid feed is air.

9. The assembly of claim 7 wherein the gaseous fluid feed subject to separation comprises separation of hydrogen gas from carbon oxides.

10. The assembly of claim 7 wherein the gaseous fluid feed is natural gas containing carbon dioxide.

11. The assembly of claim 1 additionally comprising a second permeate adapter joined with the second end of the linear permeate passage tube, the second permeate adapter having a second face portion, an oppositely disposed second back portion and a second body portion extending between the second face portion and the second back portion, the second face portion including a second receiving opening for receiving the second end of the linear permeate passage tube, the second body portion defining a second permeate passageway extending therethrough, the second body portion including a second plurality of permeate discharge openings disposed therein and in fluid communication with a second permeate stream outlet, the second permeate passageway placing the second receiving opening and the second plurality of permeate discharge openings in fluid flow communication.

12. The assembly of claim 11 wherein a second permeate stream outlet is disposed adjacent to the second permeate adapter and perpendicular to the elongated housing.

13. An array comprising a plurality of the assemblies of claim 1 connected in parallel.

14. The array of claim 13 wherein the at least one permeate stream outlet for each of the assemblies is joined in a permeate header and wherein the permeate header is disposed externally adjacent the elongated housing between the opposed first and second ends of the elongated housing.

15. An improved membrane assembly for use in gas separation, the membrane assembly comprising at least one elongated membrane pressure tube having at least one inlet for a feed stream gas, at least one outlet for a residual stream gas and at least one outlet for a permeate stream, the at least one elongated membrane pressure tube containing a plurality of spiral wound membrane separation elements formed in a linear string, the string of spiral wound membrane separation elements at least in part defining a linear permeate passage tube having opposed first and second ends, the improvement comprising:
a first permeate adapter joined with the first end of the linear permeate passage tube, the first permeate adapter having a first face portion including a first receiving opening for receiving the first end of the linear permeate passage tube, the first permeate adapter also having a first body portion extending from the first face portion oppositely the linear permeate passage tube, the first body portion defining a first permeate passageway extending therethrough, the first body portion including a first plurality of permeate discharge openings disposed therein, the first permeate passageway placing the first receiving opening and the first plurality of permeate discharge openings in fluid flow communication; and
a second permeate adapter joined with the second end of the linear permeate passage tube, the second permeate adapter having a second face portion including a second receiving opening for receiving the second end of the linear permeate passage tube, the second body portion defining a second permeate passageway extending therethrough, the second body portion including a second plurality of permeate discharge openings disposed therein and in fluid communication with a second permeate stream outlet, the second permeate passageway placing the second receiving opening and the second plurality of permeate discharge openings in fluid flow communication;
wherein the at least one inlet for a feed stream gas is centrally disposed between two of the membrane separation elements forming the membrane separation element linear string and wherein said at least one elongated membrane pressure tube can be replaced without removal of said first permeate adapter or said second permeate adapter.

16. A double permeate draw membrane assembly for use in separation of a fluid feed via membrane separation elements, the assembly comprising:
an elongated housing having opposed first and second ends, the housing also having at least one inlet for a fluid feed stream, at least one outlet for a residual stream and a first and a second outlet for a permeate stream, the housing containing membrane separation elements to form a membrane separation element linear string at least in part defining a linear permeate passage tube having opposed first and second ends;
a first permeate adapter joined with the first end of the linear permeate passage tube, the first permeate adapter having a first face portion, an oppositely disposed first back portion and a first body portion extending between the first face portion and the first back portion, the first face portion including a first receiving opening for receiving the first end of the linear permeate passage tube, the first body portion defining a first permeate passageway extending therethrough, the first body portion including a first plurality of permeate discharge openings disposed therein and in fluid communication with the first permeate stream outlet, the first permeate passageway placing the first receiving opening and the first plurality of permeate discharge openings in fluid flow communication; and
a second permeate adapter joined with the second end of the linear permeate passage tube, the second permeate adapter having a second face portion, an oppositely disposed second back portion and a second body portion extending between the second face portion and the second back portion, the second face portion including a second receiving opening for receiving the second end of the linear permeate passage tube, the second body portion defining a second permeate passageway extending therethrough, the second body portion including a second plurality of permeate discharge openings disposed therein and in fluid communication with the second permeate stream outlet, the second permeate passageway placing the second receiving opening and the second plurality of permeate discharge openings in fluid flow communication;
wherein the at least one inlet for a fluid feed stream is centrally disposed between two of the membrane separation elements forming the membrane separation element linear string and wherein said at least one membrane separation element is capable of replacement without removal of said first permeate adapter or said second permeate adapter.

* * * * *